United States Patent [19]
Krokos et al.

[11] 3,735,712
[45] May 29, 1973

[54] BULKHEAD LOCKING ARRANGEMENT

[75] Inventors: Raymond M. Krokos; John J. Kostrewa, both of Detroit, Mich.

[73] Assignee: Evans Products Company, Plymouth, Mich.

[22] Filed: Jan. 3, 1972

[21] Appl. No.: 215,199

Related U.S. Application Data

[63] Continuation of Ser. No. 865,277, Oct. 10, 1969, abandoned.

[52] U.S. Cl. ............... 105/376, 105/369 B, 105/378
[51] Int. Cl. ............................................. B60p 7/14
[58] Field of Search ................ 105/369 B, 376, 378; 292/36

[56] References Cited

UNITED STATES PATENTS

| | | | |
|---|---|---|---|
| 3,164,395 | 1/1965 | Burch et al. | 105/376 |
| 3,181,903 | 5/1965 | Olander | 105/378 |
| 3,373,701 | 3/1968 | Shook | 105/376 |
| 3,433,180 | 3/1969 | Shook | 105/376 |
| 3,464,369 | 9/1969 | Erickson et al. | 105/376 |

Primary Examiner—Drayton E. Hoffman
Attorney—Ernest A. Beutler

[57] ABSTRACT

A freight bracing bulkhead assembly embodying an improved locking arrangement that facilitates its release when a load is bearing against the bulkhead. The locking arrangement includes locking pins and supporting sockets that have cooperating tapered surfaces that are in full engagement when the locking pins are in their engaged position and which are spaced apart as the pins move toward their released positions.

2 Claims, 5 Drawing Figures

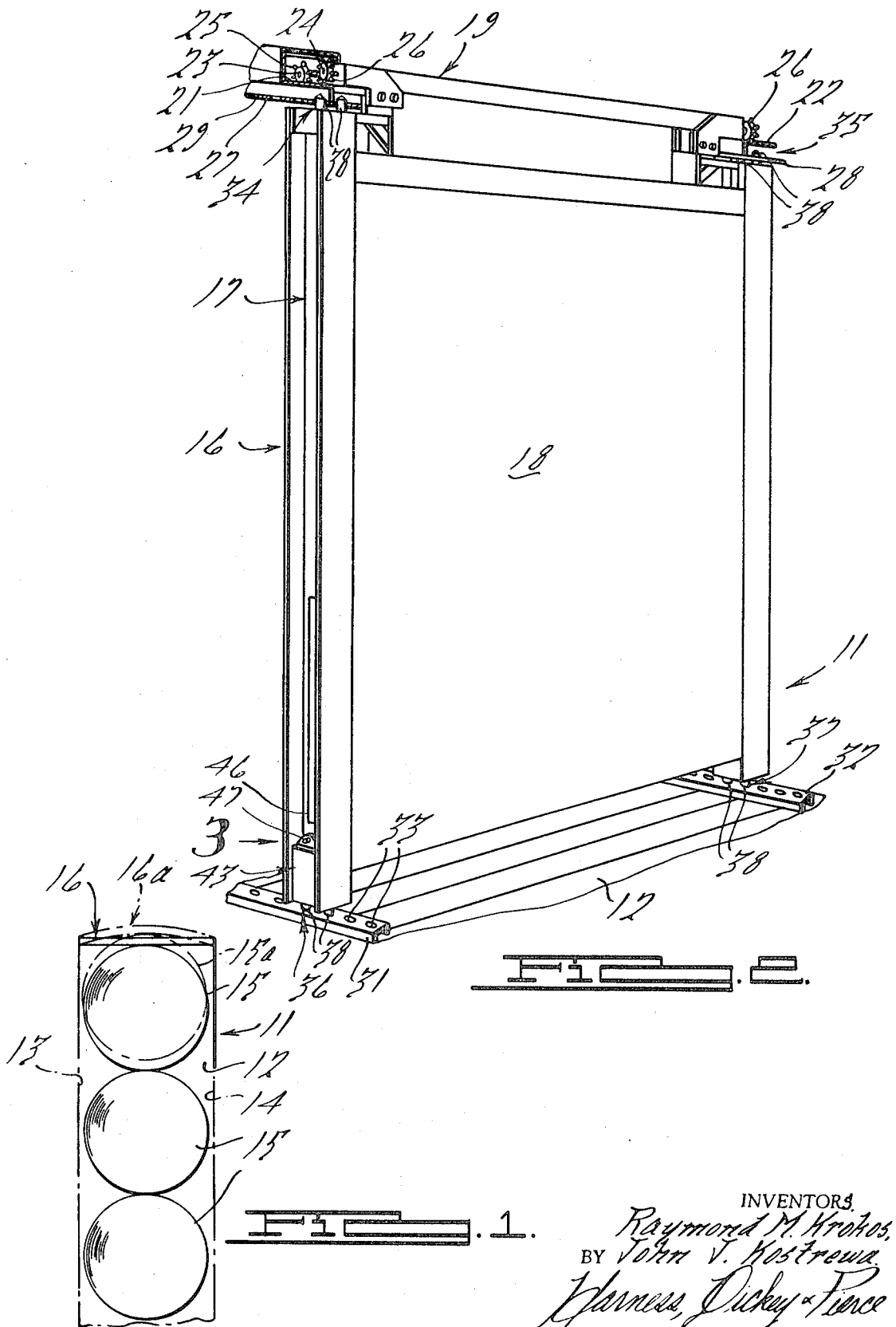

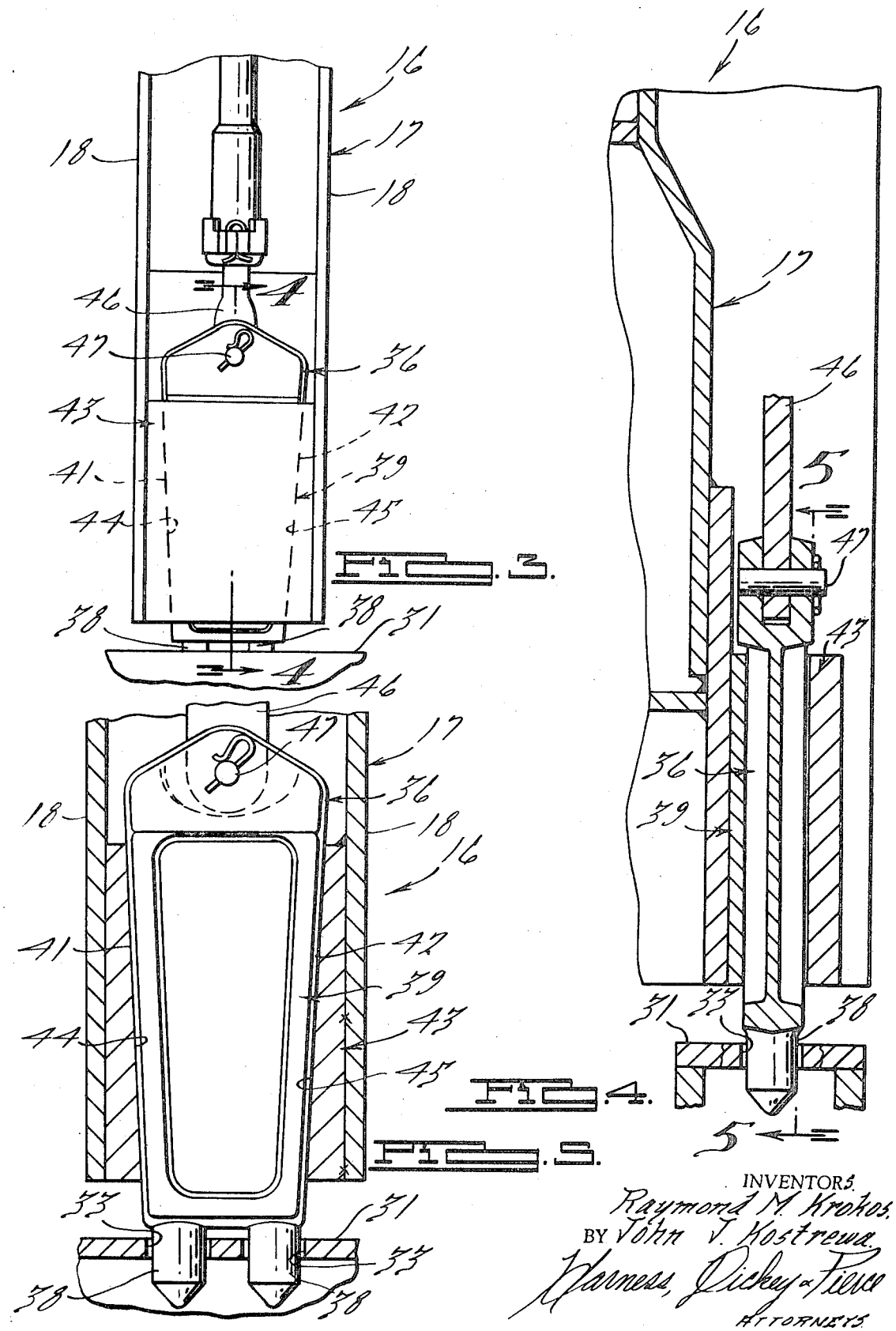

BULKHEAD LOCKING ARRANGEMENT

CROSS REFERENCE TO RELATED APPLICATION

This application is a continuation of copending application Ser. No. 865,277 filed Oct. 10, 1969, now abandoned.

BACKGROUND OF THE INVENTION

This invention relates to an improved locking mechanism and more particularly to an improved bulkhead locking mechanism.

The use of freight bracing bulkhead assemblies for holding freight against movement during transit is well known. These bulkhead assemblies find particular application in rail transportation and are highly useful in holding the freight against any significant movement during transit. Due to the tremendous shock loadings encountered in this form of transportation, the bulkhead assembly must be designed so as to withstand these shock loadings. Conventionally the bulkhead assemblies are held in preselected bracing positions by a locking mechanism that includes a plurality of locking pins that are adapted to cooperate with openings in the transporting vehicle structure. The locking pins are reciprocally supported in respective socket assemblies for movement between locking and released positions. Frequently, the transported load shifts during transit so that it applies a considerable force against the bulkhead assembly. Often times the bulkhead assembly actually deflects to a significant degree under such forces. These forces and the resultant bulkhead deflection makes it difficult to release the locking pins so that the transporting vehicle may be unloaded. It is not an infrequent occurrence to employ a fork lift truck to apply a force on the operating handle of the bulkhead locking mechanism to release the locking pins. These severe loadings cause failures in the locking mechanism.

It is, therefore, a principal object of this invention to provide a locking mechanism particularly adapted for use in a freight bracing bulkhead assembly.

It is another object to provide a bulkhead locking mechanism that may be easily moved from its locked to its released position even under the influence of high static loads and deformation of the bulkhead assembly.

SUMMARY OF THE INVENTION

A locking mechanism embodying this invention is particularly adapted for holding a freight bracing bulkhead assembly or the like in a freight bracing position. Such a locking arrangement includes a locking member adapted to coact with a cooperating locking member of the transporting vehicle for holding the bulkhead assembly in the bracing position. The locking member has a shank portion that is slidably supported in a socket opening defined by a socket member that is carried by the bulkhead assembly. The locking member is thus movable between a locking and a released position. The locking and socket members have cooperating surfaces that are in full abutting relationship when the locking member is in its locking position and which becomes spaced apart as the locking member is moved toward its released position.

BRIEF DESCRIPTION OF THE DRAWINGS

FIG. 1 is a schematic top plan view of a railway freight car embodying this invention.

FIG. 2 is an enlarged perspective view taken through a portion of the freight car in FIG. 1 and shows a bulkhead assembly embodying this invention.

FIG. 3 is a further enlarged view taken in the direction of the arrow 3 in FIG. 1 and shows a portion of the locking mechanism.

FIG. 4 is an even further enlarged cross-sectional view taken along the line 4—4 of FIG. 3.

FIG. 5 is a cross-sectional view taken along the line 5—5 of FIG. 4.

DETAILED DESCRIPTION OF THE PREFERRED EMBODIMENT

Referring first to FIG. 1, a railway freight car embodying this invention is depected schematically at 11 and includes a floor 12 and opposing side walls 13 and 14. It is to be understood that, although this invention is described in connection with a railway freight car, it may be used in connection with other freight transporting vehicles or, for that matter, in other more general applications. Any type of freight may be carried in the car 11 and in the depected embodiment large coils of steel 15 are transported. To prevent any significant movement of the freight during transit, a freight bracing bulkhead, indicated generally by the reference numeral 16 and shown in most detail in the remaining views, is provided. The bulkhead assembly 16 is supported for movement along the length of the car 11 and may be locked in preselected bracing positions to engage the freight 15, as will become more apparent as this description proceeds. During transit the freight 15 may shift to some extent, as indicated by the broken line position 15a in FIG. 1. Such shifting occurs due to the weight of the transported freight and the considerable shock loadings it undergoes. When the freight so shifts, it will apply a force against the bulkhead assembly 16 and may, in fact, cause the bulkhead assembly 16 to deflect as shown in the dotted line position 16a. With the type of locking mechanism heretofore employed, release of the locking mechanism under such conditions was difficult or impossible. Using the locking mechanism of this invention, however, release is simplified under such conditions.

Referring now to the remaining figures, the bulkhead assembly 16 is comprised of a frame assembly 17 which may be of any known type and which provides oppositely facing load engaging faces 18. At the upper end of the frame assembly 17, a trolley arrangement, indicated generally by the reference numeral 19, is provided for supporting the bulkhead assembly 16 for movement along the car 11 on wall or roof supported tracks 21 and 22. For this purpose, a pair of timing shafts 23 and 24 form a portion of the trolley assembly 19 and carry sprocket wheels 25 and 26 at their opposite ends that coact with the tracks 21 and 22 for overhead support of the bulkhead assembly 18. The details of the trolley assembly 19 are not shown since this assembly forms no part of the invention.

Supported in the car 11 adjacent the tracks 21 and 22 are a pair of upper locking pin plates 27 and 28 in which pairs of spaced apertures 29 are formed. Lower locking pin plates 31 and 32 are fixed to the floor 12 and also define pairs of longitudinally spaced apertures 33. Locking pins, indicated generally by the reference numerals 34, 35, 36 and 37 are carried at the four corners of the bulkhead frame 17. Each of these locking pins has a pair of pin portions 38. The pin portions 38 of the locking pins 34 and 35 are adapted to be received in selected of the apertures 29 and the pin portions 38 of the lower locking pins 36 and 37 are adapted to be received in selected of the apertures 33 for holding the bulkhead assembly 16 in a preselected position, as will become more apparent.

The construction of each of the locking pins 34, 35, 36 and 37 is substantially the same and, for this reason, only the locking pin 36 will be described in detail by way of particular reference to FIGS. 3 through 5. The locking pin 36 may be formed as a forging and has a shank portion 39 that has oppositely facing tapering surfaces 41 and 42. The surfaces 41 and 42 converge in a downward direction and toward respective pin portions 38. The shank portion 39 is received in a socket member, indicated generally by the reference numeral 43, which socket member is affixed in any known manner to the respective corner of the bulkhead frame 17. The socket member 43 defines a generally rectangular cross-sectional socket opening having facing tapering surfaces 44 and 45. The surfaces 44 and 45 are juxtaposed to the locking pin surfaces 41 and 42 and taper at the same angle as these surfaces. Said another way, the angle between the surfaces 44 and 45 is equal to the angle between the surfaces 41 and 42. The socket opening thus receives and slidably supports the locking pin 39 for movement between an engaged or locking position as shown in the figures and a released position. In the released position, the pin portions 38 are spaced from the apertures 33 so that the bulkhead assembly 16 may be freely moved along the car 11.

In order to operate the locking pins 34, 35, 36 and 37 between their locking and released positions, each of the pins is bifurcated at its upper end and receives one end of a respective actuating link 46. Each actuating link 46 is pivotally connected to the respective lock pin by a pivot pin 47. Each of the links 46 is connected to a common operating shaft (not shown) which, when rotated, reciprocates the locking pins 34, 35, 36 and 37 between their locking and released positions. This mechanism is not shown in any detail since it forms no part of the invention. Reference may be had to the copending application of Jackson A. Shook, entitled "Freight Bracing Apparatus", Ser. No. 685,980, filed Nov. 27, 1967, for the details of the operating structure for the respective locking pins.

It will be noted that when the locking pins 34, 35, 36 and 37 are in their locking positions, the surfaces 41 and 42 are in full facing contact with the socket surfaces 44 and 45. Thus, shock loadings applied to the bulkhead frame 17 will be distributed over these surfaces, thus reducing unit loading. In addition, there is no sharp corner contact between the locking pins and supporting socket members, thus any tendency for galling will be reduced. In a conventional construction, the surfaces of the socket opening would be parallel to the axis of reciprocation of the locking pin and the respective locking pin surfaces would also be parallel. The necessary manufacturing clearance would permit cocking of the pin within the socket and jambing under shock loadings. Under these conditions, release is difficult or impossible.

In the described construction, clearances in the parts might cause the aforenoted jambing or galling condition. However, the tapering arrangement more nearly assures full face-to-face surface contact. In addition, it should be noted from FIG. 5 that as the pin 36 is withdrawn relative to the socket member 43, a clearance immediately opens between the surfaces 41–44 and 42–45. This clearance increases as the pin 36 is moved toward its released position. The establishment of this large clearance reduces the frictional area in contact and thus, although there may be a high initial release force required, this is only a momentary condition. In addition, if the bulkhead frame 17 has been deflected, the clearance will permit the pin 36 to center itself relative to the adjacent apertures 33 so that it may be easily withdrawn.

It has been noted that the construction of each of the locking pins 34, 35, 36 and 37 is the same. Under some circumstances, it may only be necessary to provide the tapered surfaces 41 and 42 and the corresponding tapered socket surfaces 44 and 45 at the lower end of the bulkhead assembly 16. That is, in some instances, it may only be necessary to taper the surfaces of the locking pins 36 and 37.

What is claimed is:

1. A bulkhead adapted to engage and hold freight in a transporting vehicle, said bulkhead including a bracing portion for engaging freight and subject to deformation and deflection in the direction of loading upon the shifting of the freight, a locking pin having a locking part thereof adapted to cooperate with a track carried by the vehicle for locking the bulkhead in a preselected position and a shank part, and a supporting part carried by said bracing portion of said bulkhead, said shank portion being slidably supported within an opening defined by said supporting part for movement in a direction normal to the direction of loading between a locked position and a released position, said supporting part and said locking pin shank part having facing respective portions adapted to be engaged with each other for retaining said bulkhead in position under the influence of the application of freight loadings thereupon in the direction of loading by precluding relative movement between the locking pin and supporting member in the direction of loading, said portions being inclined at an angle relative to the path of movement of said locking pin between its locked position and its released position, said angle diverging from the path of movement in the direction of movement of said locking pin from its locked position to its released position for providing for movement of said bracing portion of said bulkhead assembly relative to said locking pin in the direction of loading as said locking pin is moved from its locked position to its released position for reducing the frictional forces acting in opposition to the release of said locking pin.

2. A bulkhead as set forth in claim 1 wherein the locking pin and supporting part have pairs of respective facing portions disposed on opposite sides of a plane passing through the locking pin shank portion along its path of movement and perpendicular to the direction of loading, the pairs of cooperating portions diverging from said plane in the direction of movement of said locking pin from its locked position to its released position regardless of which side of the bulkhead is loaded and regardless of the direction of loading.

* * * * *